RADIAL PHONOGRAPH ARM AND FLEXIBLY POSITIONED PICKUP ASSEMBLY

Filed Nov. 15, 1966 4 Sheets-Sheet 1

INVENTOR
ELWOOD G. NORRIS
BY
Christensen, Sanborn, & Matthews
ATTORNEYS

INVENTOR
ELWOOD G. NORRIS
BY Christensen, Sanborn, & Matthews
ATTORNEYS

RADIAL PHONOGRAPH ARM AND FLEXIBLY POSITIONED PICKUP ASSEMBLY

Filed Nov. 15, 1966 4 Sheets-Sheet 3

INVENTOR.
ELWOOD G. NORRIS

BY Christensen, Sanborn, & Matthews

ATTORNEYS

Dec. 24, 1968 E. G. NORRIS 3,418,435

RADIAL PHONOGRAPH ARM AND FLEXIBLY POSITIONED PICKUP ASSEMBLY

Filed Nov. 15, 1966 4 Sheets-Sheet 4

INVENTOR.
ELWOOD G. NORRIS

BY Pasqual J. Sferra

ATTORNEY

United States Patent Office 3,418,435

Patented Dec. 24, 1968

3,418,435
RADIAL PHONOGRAPH ARM AND FLEXIBLY POSITIONED PICKUP ASSEMBLY

Elwood G. Norris, 7039 38th NE., Seattle, Wash. 98105

Continuation-in-part of application Ser. No. 389,838, Aug. 17, 1964. This application Nov. 15, 1966, Ser. No. 600,338

23 Claims. (Cl. 179—100.4)

ABSTRACT OF THE DISCLOSURE

The present invention relates to sound recording and reproducing devices such as phonographs and more particularly to an improved phonograph arm and improved phonograph pickup assembly associated therewith. The system includes a conductive tone arm which remains stationary during record play with the head or pickup assembly moving along the arm and in a radial path across the record. A radio frequency receiver or a high frequency oscillator is coupled with the tone arm in a manner such that the receiver receives modulated R–F energy or the output of the oscillator is modulated in accordance with changes induced in a resonant circuit contained in the pickup head. The pickup head merely rides on the arm and is removable therefrom, and includes an R–F transmitter or an inductor which is so positioned that R–F signals or changes in the resonant circuit of which the inductance is a part causes signals to be coupled via the arm to the receiver or to the oscillator. Details of the mechanical nature of the arm itself which permits selective positioning of the head are also described.

This application is a continuation-in-part of my prior application Ser. No. 389,838 filed on Aug. 17, 1964 (now abandoned), entitled "Phonograph Tone Arm and Pickup Assembly." In the manufacture of an original master disc the recording head moves in a true radial path toward the center of the master record, cutting a spiral recording groove in the recording medium. Most reproducing systems utilize a pivoted tone arm and pickup head mounted on one end thereof for engagement with the record grooves, and thus it has been recognized that distortion is introduced during play back due to the pickup head following an arcuate path across the record rather than a true radial path. Much effort has been directed toward the design of pickup heads and support arms which will cause the head to move in a true radial path across the record. One difficulty encountered in providing a radially moving pickup head is that the tracking force is often sufficient to cause undue record wear. One reason for this is the use of electrical leads from the head to an amplifier, thus necessitating repeated flexing of the leads as the head moves. Complicated head movement devices associated with the head support arm have also been devised, but generally they have led to cumbersome and expensive equipment. In addition, it has been found that the fidelity of the resulting systems leaves much to be desired. The problems are increased in the case of stereophonic reproducing systems since channel separation must be provided. This has generally necessitated additional wires running from the head to an amplifier, with such additional leads causing increased mechanical loading and retardation of head movement.

It is accordingly an object of the present invention to provide an improved phonograph tone arm and pickup head.

It is another object of the present invention to provide a simplified and low cost phonograph pickup assembly wherein the head moves in a true radial path across a record.

A further object of the present invention is to provide a phonograph pickup head and support arm wherein the head is light weight and is readily removed from the arm. It is another object of the invention to provide an improved high fidelity pickup head and support arm assembly utilizing low cost components and yet achieving a degree of fidelity not obtainable with other type systems.

Another object of the invention is to provide a phonograph tone arm and stereophonic pickup head associated therewith and wherein the pickup head is not permanently mechanically affixed to the arm so that the pickup head is easily detached from the arm for cleaning or replacement.

Another object of the present invention is to provide a novel stereophonic capacitive pickup head. An additional object is to provide an improved tone arm and pickup head associated therewith and including means for engaging and disengaging the stylus of the pickup head from a record in a manner which minimizes the likelihood of damage to the stylus or to the record and wherein the stylus can be selectively positioned in any groove on the record with little likelihood of scratching the record surface.

The above objects and advantages of the invention are achieved through the use of a simplified tone arm which in one embodiment consists essentially of an elongated U shaped signal conducting member supported at one end adjacent to a record and extending across the surface of a rotating record in a direction which is substantially parallel to a radius of the record. One of the legs of the member is held against translation but is adapted for rotation while the other leg is permitted to undergo free movement in an arcuate path having the stationary leg as its pivot axis. The pickup rod or tone arm is provided with a simple inductive loop (double loop in the case of stereophonic systems) adjacent to the support for the stationary leg to serve as a signal output circuit for coupling signals between the head carried by the tone arm and stationary oscillators.

One preferred embodiment of the pickup head has a stylus which engages the record grooves and has attached to it a first plate. A second stationary plate and the movable plate define a first variable capacitor. A tuning inductance connected in series circuit with this variable capacitor completes an L–C circuit having a resonant frequency approximately equal to the frequency of the oscillator which is coupled to the head support arm. The head is removably mounted in frictional engagement with the stationary leg of the arm and is adapted for translational movement with respect thereto. The head is provided with an upwardly extending portion which is selectively engaged by the movable leg of the arm to cause rotational movement of the pickup head about the stationary leg and thus permit selective engagement and disengagement of the stylus with the record. The mechanical arrangement is such that a very low weight pickup head which exerts an extremely small vertical force on the record is provided with the lateral force on the record grooves caused by movement of the head on the stationary leg being minimal.

The electrical arrangement of the system is such that the inductor and variable capacitance in the pickup head act as a variable impedance or energy absorbing circuit which is coupled by the support arm itself with the tuning inductance of the oscillator circuit maintained stationary with respect to the arm. Thus the variable electric load of the head is loosely coupled with the oscillator circuit and serves to vary the output signals from the oscillator in accordance with variations in the capacitance of the tuned circuit within the pickup head. In one preferred embodiment of the invention, the pickup head merely rests on the stationary support leg and can be removed therefrom and replaced thereon without any electrical connections and disconnections being made. Thus the stylus carried in the head is easily cleaned.

In a stereophonic embodiment of the invention a pair of tuned L–C circuits are carried in the head and are respectively tuned near to the frequencies of first and second oscillators positioned adjacent to first and second coils connected to the pickup arm. By operating the oscillators at relatively high frequencies which are separated in the order of 10 megacycles it is found that complete channel separation is achieved and high-fidelity stereophonic sound reproduction is provided. It has been found that the tuned circuits carried in the head act as variable energy absorption circuits causing the amplitude of the output signals from the oscillators to vary in accordance with the modulation resulting from stylus movement with the frequency of the oscillators remaining essentially constant. Thus conventional amplification techniques can be used in tandem with the output of the oscillators for providing amplified audio signals corresponding to the audio signals recorded on the disc.

In another embodiment the head uses a conventional variable reluctance pickup cartridge to modulate the resonant circuits within the head provided by a pair of inductors and variable capacitance diodes. As in the variable capacitance embodiment, the change in the two resonant circuits are reflected via the support arm to stationary oscillators coupled with the arm. In a further embodiment a small radio transmitter is carried in the head with the support arm serving as a pickup antenna for a receiver mounted near the end of the arm.

In a preferred form of the pickup arm a tubular metal rod is formed in the shape of an elongated U with one leg being provided with an elongated slot or opening in the bottom thereof. The other leg is supported for rotation so that the slotted leg can rotate thereabout. An endless drive member such as a flexible string or endless coiled spring is disposed inside the rod and is engageable through said slot by an upstanding lug on the rear edge of the pickup head. The lug is adapted for selective entrance into the slot and thus for selective engagement with the endless drive member when the movable portion of the arm is rotated about the stationary portion. When the endless drive member is then driven by rotation of a manual control knob, the pickup head is made to undergo translational movement along the stationary leg of the arm for selective positioning at a given radius of the record.

In another embodiment a single straight rod is provided with an endless drive member to move the head along the rod to thereby provide a more compact assembly.

The above as well as additional objects, advantages, and novel details of the invention will be more clearly understood from the following description when read with reference to the accompanying drawings.

Figures 9, 9A, 9B, 9C, 9D, 10:
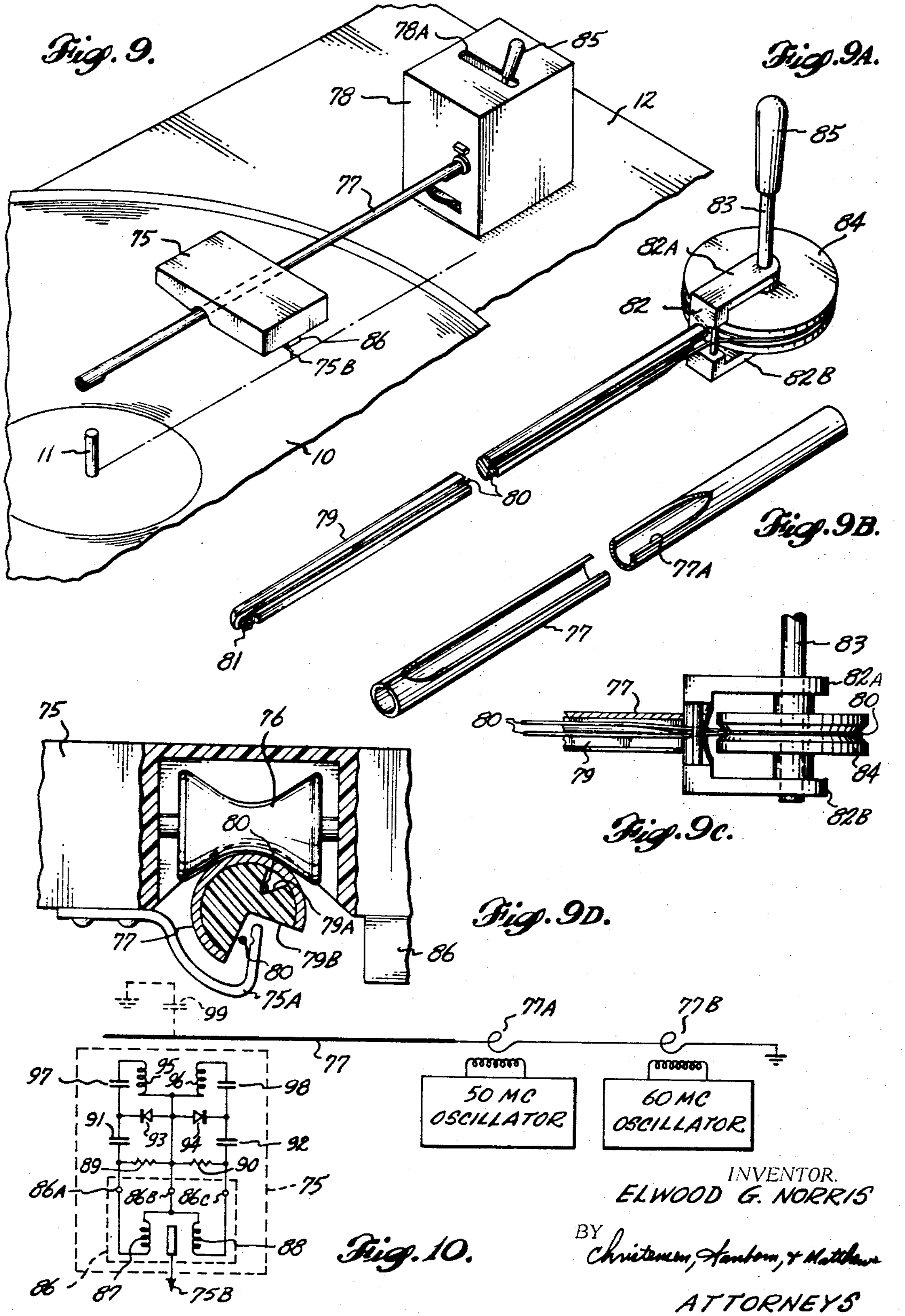

FIGURE 9 is an isometric view of a single rod embodiment of the invention having a remote control lever for moving the head to a selected position; FIGURE 9A is an isometric view of the internal rod and drive mechanism for the embodiment of FIGURE 9; FIGURE 9B is an isometric view of the bottom of the support rod shown in FIGURE 9; FIGURE 9C is an enlarged view of the rear end of the rod shown in FIGURE 9A; and FIGURE 9D is an enlarged elevation view partly in cross section showing the manner in which the apparatus of FIGURE 9 operates.

FIGURE 10 is a circuit diagram of a preferred form of variable reluctance pickup head adapted for use with any of the various support arms.

Figures 11, 12, 13, 14, 15, 16, 17:
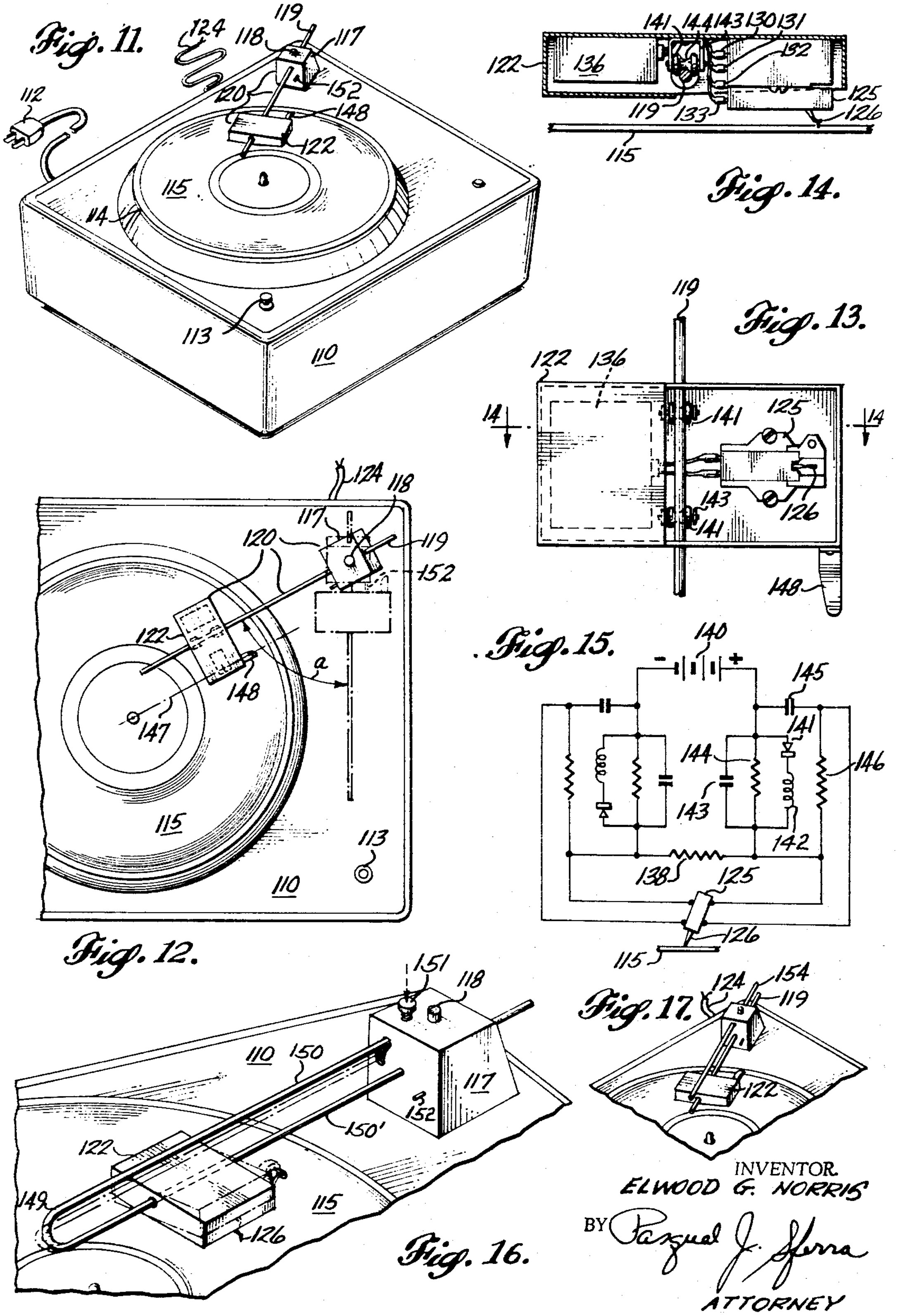

FIGURE 11 is an isometric view of a conventional phonograph turntable upon which is mounted a tone arm and pickup assembly made in accordance with the teachings of this invention.

FIGURE 12 is a plan view of the device shown in FIGURE 11.

FIGURE 13 is a bottom view of the movable pickup head of the tone arm shown in FIGURE 12.

FIGURE 14 is a sectional view of the pickup head taken along line 14—14 of FIGURE 13.

FIGURE 15 is a schematic wiring diagram of the electric circuitry for radio transmission means for a stereophonic phonograph contained in the movable pickup head.

FIGURE 16 illustrates a tone arm construction which embodies means for retracting the needle from the record.

FIGURE 17 illustrates alternative antenna means for receiving radio signals from the radio transmission means within the movable pickup head.

Figures 1, 1A, 2, 3, 4:
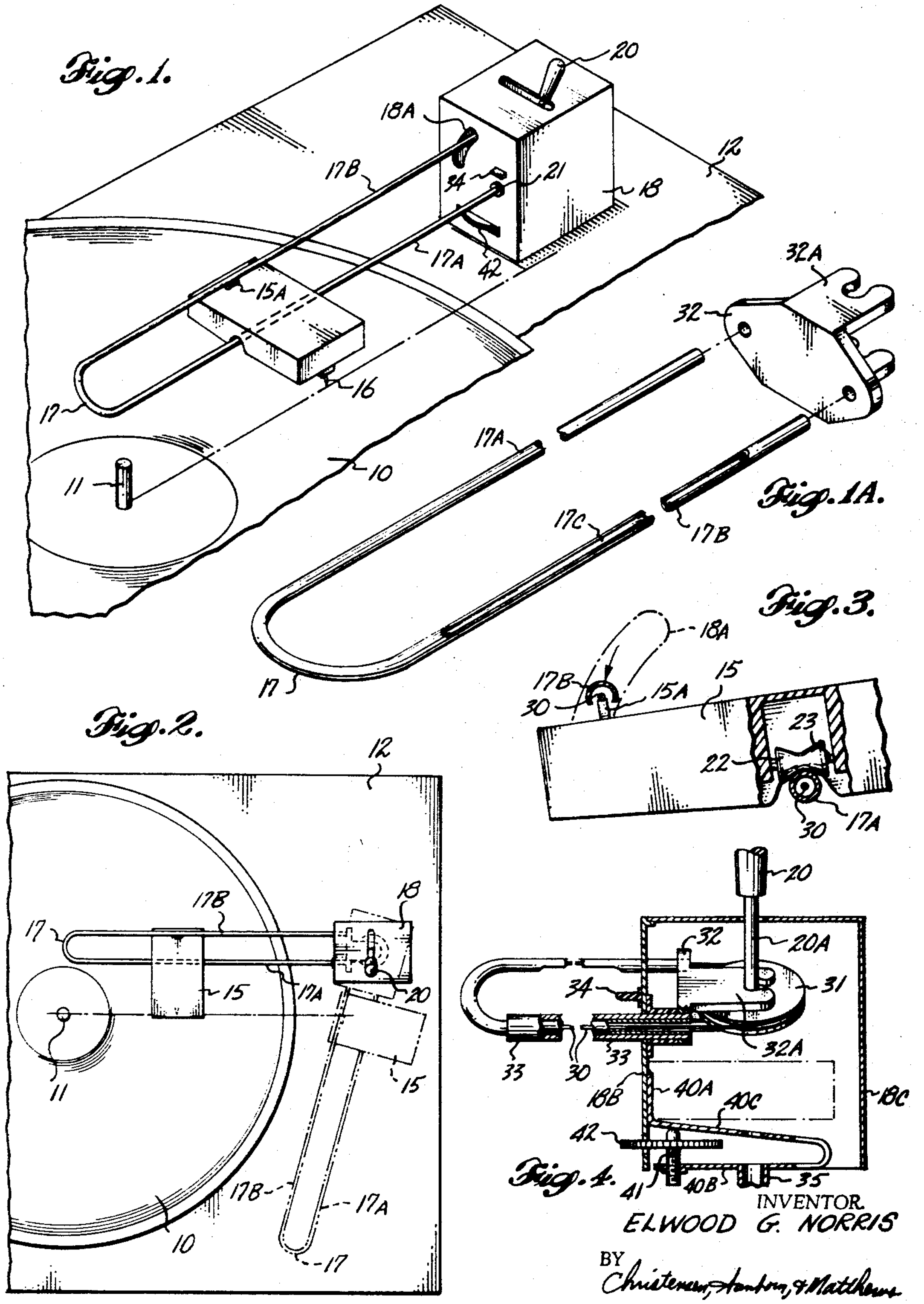
FIGURE 1 is a partial perspective view of a record player having an improved support arm and pickup head of the present invention associated therewith.
FIGURE 1A is a perspective view of the bottom of the support arm shown in FIGURE 1.
FIGURE 2 is a top view showing the manner in which the arm and pickup head are rotated for record changing.
FIGURE 3 is an enlarged perspective elevation of the pickup head with a portion cut away to show the support arm.
FIGURE 4 is an enlarged sectional view of the apparatus for moving the head with respect to the support arm and including a showing of one preferred form of the support arm assembly.

Referring now to the drawings and in particular to FIGURE 1 a conventional disc type sound record 10 is shown as being supported on a turntable having a spindle 11 passing through the center of the record. An appropriate motor mounted within the housing 12 serves to rotate the record in the conventional manner. The embodiment of the novel pickup head 15 of the present invention shown in FIGURE 1 includes a downwardly extending stylus member 16 which is positioned for engagement with the grooves on the record 10 by being supported on one leg 17A of the pickup arm 17 which is shown as being of an elongated U shape. The pickup arm is made of material which serves to conduct high frequency electromagnetic energy and thus for example can be made of tubular metal stock such as a copper tubing. The leg 17A is maintained in a position which is parallel to a radius of the record 10 and thus extends outwardly from the mounting block 18 in a direction across the record such that the stylus 16 is confined to lateral movement along a line which is coincident with a true radius of the record 10. The leg 17A is held against translation within the housing 18 but is supported for rotational movement about its longitudinal axis on bearing 21 so that the leg 17B can swing in an arcuate path within the arcuate opening 18A of the housing 18. The housing 18 itself is supported for rotational movement about a support shaft which extends downwardly through the housing 18 and is supported by the record player base 12. Arcuate swinging movement of the leg 17B is controlled by the manual control knob 20 described in greater detail hereinafter.

Figure 5:
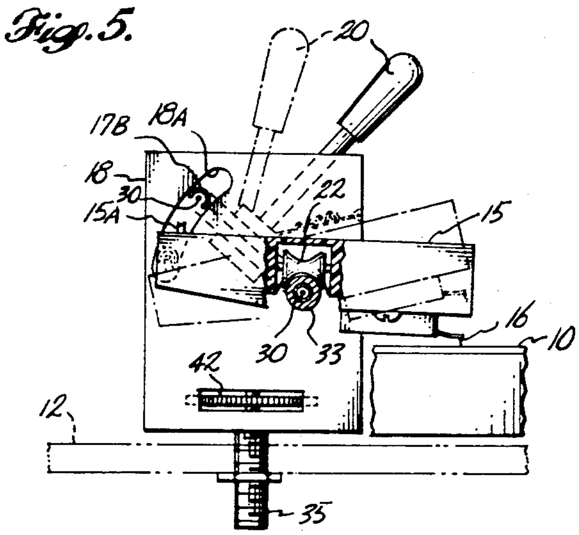
FIGURE 5 is an enlarged front elevation of the embodiment shown in FIGURE 4 illustrating the manner in which the stylus is moved into and out of engagement with the record.

As seen most clearly in FIGURES 2, 3 and 5 the pickup head 15 is supported for sliding movement along the upper surface of the leg 17A with the support for the head 15 on the leg 17A being such that the end thereof having the stylus 16 extending downwardly therefrom is heavier than the end thereof having the upwardly extending protrusion or lug 15A thereon. Thus the stylus 16 tends to come into engagement with the grooves of the record unless a downward force is exerted on the left end of the pickup head as seen in FIGURE 3. As noted hereinafter the head 15 includes a minimum of electrical parts and thus the downward pressure of the stylus 16 on the record is very small. It has been found that such pressure is extremely small even though the center of gravity of the head is well to the right of the leg 17A in FIGURE 3. It should be noted that the head 15 is merely resting on the leg 17A and accordingly is easily removed therefrom. The leg 17A may be coated with a material having a low coefficient of friction such as polytetrafluoroethylene (Teflon) so that the head 15 slides along the upper surface of the leg 17A with a minimum of resistance to such lateral movement. Thus when the stylus 16 is engaged with the grooves of the record the head 15 will track the groove even though very little downward force is exerted on the stylus. To further reduce lateral resistance the head is provided with a pair of tapered roller bearings 22 which are carried on pins 23 with the bearings partially conforming to the contour of the leg 17A.

It will be seen from FIGURE 3 that when the leg 17B of the pickup arm is moved to its downward position by the operator pushing on the control lever 20 the head 15 will be pivoted about the leg 17A and the stylus 16 will be removed from the record. In the embodiment shown in FIGURES 1 and 2 the lower surface of the tubular pickup arm is cut away as at 17C on the lower side of leg 17B (FIGURE 1A). An endless frictional member shown as a string or cord 30 (FIGURE 3) is disposed within the pickup arm for relative movement with respect to the arm. As seen in FIGURE 4 the lower end of the control lever 20 has a drive wheel or disc 31 secured to the lower end thereof with the cord 30 being disposed around the wheel. The shaft 20A of the control lever is supported for rotation by the support member 32 which is secured to the ends of the legs 17A and 17B. The member 32 is provided with a pair of arms 32A having openings into which the shaft is forced for "snap action" seating with the wheel 31 disposed between arms 32A. Thus the control member 30 by being secured by member 32 to the tubular arm 17 is adapted for rotation with the arm 17 on bearing 21. In the embodiment of FIGURE 4 the bearing is in the form of an elongated tubular rod 33 disposed about leg 17A with the head being then carried on the rod 33.

The arrangement is such that when the control member 20 is rotated, the string 30 will undergo translation within the arm 17. If the control member 20 and arm 17 have not been rotated with respect to the bearing 21 of FIGURE 1 (or tube 33 of FIGURE 4) then the parts will be in the position illustrated in full lines in FIGURE 5 and rotation of the control member 20 will have no effect on the pickup head. However if the control member 20 is moved in a leftward and downward direction then the parts will be in the positions illustrated in dashed lines in FIGURE 5 with the upwardly extending protrusion or lug 15A on the head 15 being disposed within the axial slot 17C in leg 17B and engaged with the drive member 30. Thus when the control knob 20 is rotated with the parts in the positions illustrated in FIGURE 3 the head 15 will be translated along the leg 17A for selective positioning of the stylus 16 with respect to the record. A simplified mechanism is therefore provided for engaging and disengaging the stylus 16 with the record and for simultaneously permitting the operator to determine the exact point at which the stylus 16 will engage the record. By providing suitable markings on the housing 18 adjacent to the control knob 20 and a corresponding marking on the control knob 20 the operator is able to move the stylus into engagement with any selected groove on the record and hence is able to initiate sound reproduction at any selected point on the record.

Figure 6:
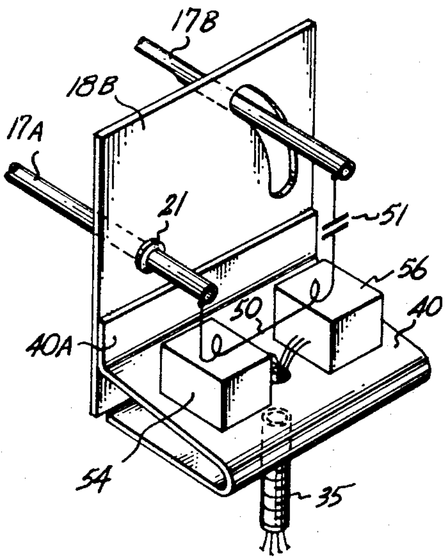
FIGURE 6 is an enlarged view of the interior of the arm support housing showing the location of the oscillators used in a stereophonic embodiment.

When the record is to be changed, the member 20 is first pushed to the left to cause engagement of lug 15A with cord 30 and removal of the stylus from the record. It is then rotated in a counterclockwise direction as seen in FIGURE 2 to move the head 15 to its innermost position adjacent to the housing 18. A bumper 34 on housing 18 arrests the head. When the head 15 has moved to its innermost position the control member 20 engages a lug on the housing 18 so that the housing 18 will be rotated in response to further rotation of the member 20. The entire arm will therefore be moved out of alignment with the record to the position shown in dashed lines in FIGURE 2 to permit record changing. As seen in FIGURES 4, 5 and 6 the housing 18 is supported for rotation by being secured to the shaft 35 which passes through the turntable housing 12 and is supported for rotation thereby.

In the embodiment of the invention illustrated in FIGURES 4 and 5 the pickup head 15 rides on the separate sleeve or tubular member 33 which is disposed about the leg 17A of the pickup arm. The leg 17A is adapted for rotation within the tubular member 33 as a bearing with the member 33 being rigidly secured to the housing 18. Construction of the apparatus is thus simplified and a pleasing overall appearance is obtained.

Referring to FIGURES 4, 5 and 6 the construction details of one preferred support for the arm 17 and associated parts will be described. The front wall 18B of the housing 18 is rigidly secured to the upstanding flange 40A of the housing support frame 40 carried by the post 35. The frame 40 is provided with a horizontal section 40B having the post 35 extending downwardly therefrom and an upwardly inclined section 40C. An adjustment screw 41 having a knurled wheel 42 secured thereto is threaded into section 40B and is engaged with the lower edge of section 40C so that rotation of the wheel 42 will serve to adjust the angular relationship of the section 40B and 40C. Thus the angular relationship of the arm 17 with respect to the record surface is readily adjusted. The remainder of the housing frame 18C provides the two sidewalls, back, and top for the housing 18 and is removable from the front wall 18B which is fixed to frame 40. The frame 40 and shaft or post 35 are readily made as a single piece of plastic material by molding techniques with the natural resiliency of the material serving to hold the same in engagement with the screw 41.

Figure 7:
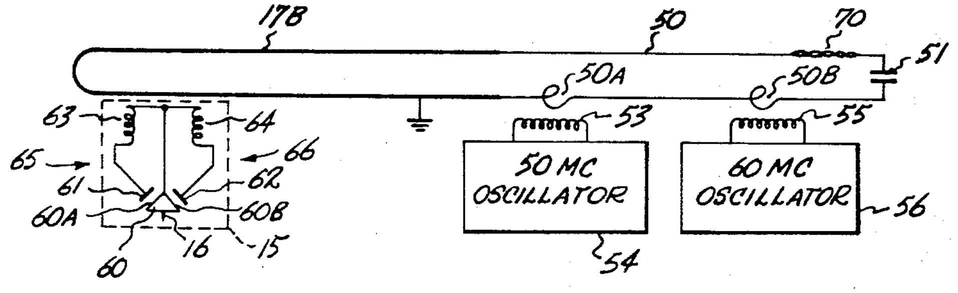
FIGURE 7 is a schematic circuit diagram partially in block form showing the electrical details of a preferred stereophonic embodiment of the invention.
Figure 8:
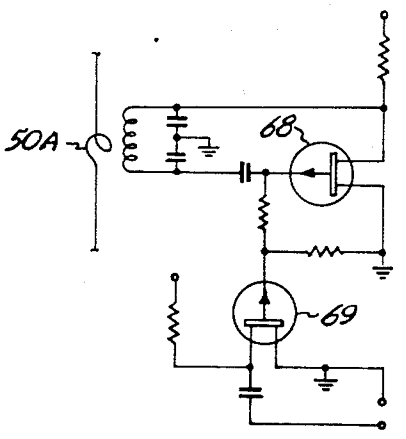
FIGURE 8 is a schematic circuit diagram of one type of oscillator which is conveniently utilized in the system shown in FIGURE 7.

Referring now to FIGURES 7 and 8 the details of the manner in which the pickup head operates to provide output signals without being electrically wired in the conventional sense to any other components will be described. It will be seen that first and second single loop inductive sections 50A and 50B are provided in the wire 50 which is directly connected to leg 17A and by capacitor 51 to leg 17B. The inductor or single loop 50A is positioned adjacent to the inductor 53 which forms part of a high frequency oscillator circuit shown generally at 54. In a similar manner the inductor or single loop 50B is positioned adjacent to the inductor 55 of the second oscillator 56. For purpose of illustration the oscillators 54 and 56 are shown as operating respectively at 50 and 60 megacycles.

The pickup head itself will be seen to include a first conductive member 60 having slanted surfaces 60A and 60B thereon with the conductive member 60 being secured to the stylus 16. The member 60 moves in accordance with movements ofthe stylus caused by the grooves in the record. While the system of the invention will work equally well for monaural or stereophonic sound reproduction the circuit diagrams shown herein are illustrated for the case of stereophonic sound reproduction. Stationary metallic plate members 61 and 62 positioned adjacent to the surfaces 60A and 60B are respectively connected to the inductive windings 63 and 64 contained within the head 15. One end of each inductor 63 and 64 is electrically connected to the metallic member 60 and thus it will be seen that first and second series L–C circuits 65 and 66 are provided. The two circuits are respectively tuned to be resonant at frequencies which are respectively near to the frequencies of the oscillators 54 and 56. The inductors 63 and 64 are positioned adjacent to the leg 17A of the pickup arm with the longitudinal axes of each winding 63 and 64 being perpendicular to the longitudinal axis of the leg 17A. It is of importance to note that the head 15 has no external plug connections which must be made to physically tie the head to the oscillators. Thus the head can be removed at will for cleaning or replacement.

It is found in practice that with the arrangement shown in FIGURE 7, the movements of the stylus 16 resulting from the grooves in the record will cause the amplitude of the signals from oscillators 54 and 56 to be modulated in accordance with stylus movements. It is believed that this is due to impedance or energy absorption characteristics of the two tuned circuits 65 and 66 being respectively reflected in the circuits of the oscillators 54 and 56. It is found that every loose coupling between the pickup head inductors 63 and 64 and the leg 17A as well as very loose coupling between the leg 17A and the oscillators 54 and 56 will suffice for causing modulated output signals from the oscillators 54 and 56. It is also found that the particular type of oscillator is not critical and thus a transistor oscillator such as shown in FIGURE 8 is conveniently utilized. In one system oscillators 54 and 56 each used a circuit such as shown in FIGURE 8, with low cost field effect transistors 68 and 69 having been found to be adequate. The output signals were found to be amplitude modulated in accordance with stylus movement.

While the system is not limited to specific frequencies for proper operation. It will be seen that in FIGURE 7, 50 and 60 megacycle oscillators are illustrated as being inductively coupled with the leg 17A. It has been found in practice that with a 10 megacycle difference between the frequencies of the two oscillators complete channel separation is achieved and very high fidelity sound reproduction from a stereophonic record is obtained even though the oscillators are mounted near each other on the frame 40 as shown in FIGURE 6. It should be noted in FIGURE 7 that the leg 17A is illustrated as being electrically grounded. While such as not essential to the operation of the system, it does help avoid any noise due to a person touching the support arm. Also in the circuit diagram of FIGURE 7, it will be seen that capacitor 51 interconnects the ends of the U shaped pickup arm electrically. This arrangement, while not necessary for system operation, has been found advantageous in that 60 cycle hum is avoided through the use of a grounded leg 17A and capacitive coupling between the ends of the arm. In one embodiment of the invention a braided wire 70 was utilized for connecting the capacitor 51 to the leg 17B to permit movement of the leg 17B with respect to the capacitor 51. In the system using 50 and 60 megacycle oscillators the capacitor 51 was in the order of 50–100 pico-farads. The capacitor also serves to avoid the introduction of a spurious signal should a person touch the pickup arm.

Turning now to FIGURES 9 and 9A–9D, a further embodiment of the present invention will be described. In the embodiment of FIGURES 9–9D the pickup head 75 is provided with support rollers 76 which are adapted to ride on the upper surface of the tone arm and support rod 77 which extends outwardly from the housing 78. Housing 78 is supported for rotation on the turntable housing in the manner illustrated with respect to the embodiments of FIGURES 1 and 6. The rod 77 is seen most clearly in FIGURE 9B to have an elongated axial opening 77A provided in the bottom therof so that the hook-shaped protrusion 75A of the head 75 (FIG. 9B) can move freely in an axial direction therealong. The stylus 75B therefore is moved in a true radial direction on the record. During record play the hook 75A is disengaged from any contact with other parts so that the head 75 rides freely on the stylus and on the rollers 76.

The elongated rod 79 seen in FIGURE 9A is disposed within the outer support rod 77 and is of such diameter that the outer rod 77 acts as a bearing for rotation of the rod 79 therewithin. The rod 79 is preferably made of a plastic material such as Delrin or other similar material having a low coefficient of friction and easily machined to the desired configuration. The outer rod 77 is of a suitable radio frequency signal translating material such as brass. The rod 79 has a first longitudinal groove 79A as well as an elongated arcuate section 79B cut therein so that an endless drive cord 80 is free to move axially with respect to the rod 79 and without having its movement impeded by contact with the outer support rod 77. The outermost end of the rod 79 can be provided with an indentation or slot for guiding the movement of the cord 80, or in the alternative a suitable pulley 81 can be mounted on the end of the rod for guiding the movement of the cord therearound. A support bracket 82 is secured to the innermost end of the rod 79 and is provided with arms 82A and 82B which support the control shaft 83. A drive wheel 84 secured to the shaft 83 is maintained between the arms 82A and 82B and has the cord 80 disposed thereabout in a manner such that when the shaft 83 is rotated by means of the control knob 85, the cord 80 will be driven along the rod 79. As seen in FIGURE 9 the housing 78 in provided with an elongated opening 78A through which the shaft 83 passes. The arrangement is such that when the control member 85 is pushed to the left in FIGURE 9, the shaft 79 will be rotated in a counterclockwise direction to bring the cord 80 into engagement with the upper end of the hook-like member 75A on the head 75. Continued rotation of the shaft 77 therefore causes the stylus 75B to be removed from its position of engagement with the record groove. When the knob 85 is then rotated the head 75 will be carried by virtue of its engagement with the cord 80 and hence the head 75 is selectively positioned at any groove on the record or is moved to its innermost position for record changing. As in the previous embodiments, the weight of the entire head 75 is in itself very small with the location of the support shaft 77 with respect to the center of gravity of the head being such that the end of the head having the stylus 75B extending downwardly therefrom maintains the stylus in engagement with a record groove. Thus a very light tracking force in the order of 1 gram or less is obtainable. As in the previous embodiments, the head 75 is readily removed from the shaft 77. Since the embodiment of FIGURE 9 includes the hook 75A for engaging the cord 80 the head 75 is removed by pulling the head leftwardly off the left end of the shaft 77. The hook 75A can also be made of resilient material such that it can be temporarily deformed to facilitate removal from the support rod 77.

The circuitry within the head 75 can be identical to that shown in FIGURE 7. Thus no mechanical connections of electrical wires need be made from the head 75 to an amplifier since the rod 77 serves to couple the impedance characteristics of the circuitry within the head 75 to a pair of oscillators 54 and 56 mounted within the housing 78. The teachings of the present invention can also be utilized with a reluctance type pickup cartridge such as is readily available on the market and thus there is illustrated in FIGURE 10 a preferred embodiment of a novel circuit arrangement adapted for use in the head 75 or in the head 15 of the previous embodiment. A conventional variable reluctance stereophonic pickup assembly 86 is shown as having the stylus 75B extending downwardly therefrom and positioned with respect to the coils or inductances 87 and 88 such that the inductance of the windings 87 and 88 will be altered in accordance with stylus movement for stereophonic sound reproduction. As is conventional in the art, the reluctance type pickup assembly 86 is provided with three output terminals 86A, 86B and 86C which in the present invention are within the head 75 and connected to the remaining circuitry in the head 75. The remaining circuitry includes matching impedances shown as resistors 89 and 90 respectively connected across leads 86A and 86B, and leads 86B and 86C. Coupling capacitors 91 and 92 shown as electroytic type capacitors serve to couple the signals from the two channels to the variable capacitance diodes (commonly referred to in the art as varicaps) 93 and 94. Inductors 95 and 96 are respectively connected in series circuit with the varicaps 93 and 94 to provide first and second tuned circuits which are tuned to frequencies which approximate the frequencies of the two oscillators 54 and 56. As in the embodiment of FIGURE 7, the axes of the coils 95 and 96 are perpendicular to the longitudinal axis of the rod 77 for maximum coupling therewith. It has been found that the coils 95 and 96 can be conveniently located in the left end of the head 75 and wound such that the planes of the coils are parallel to the top of the head 75. Hence the axes of the coils are automatically properly oriented with respect to the support rod 77 during record play. While the tuned circuits provided by the inductors 95 and 96 and varicaps 93 and 94 work well without any additional capacitance in the circuit, it has been found that capacitors 97 and 98 connected in the circuits are of assistance during testing. It is believed that during operation of the system the rod 77 applies a very low voltage across the varicaps 93 and 94 due to signal energy from the oscillators 54 and 56 and thus as the pickup windings 87 and 88 alter the voltage across the varicaps 93 and 94 the capacitances thereof change causing the amplitude of the output signals from the oscillators 54 and 56 to change in the same manner. As in the previous embodiment, it has been found that faithful stereophonic sound reproduction is achieved with effective channel separation being obtained even though the oscillators 54 and 56 are physically near each other and are coupled to the common rod 77.

It will be seen that the end of the rod 77 is electrically connected through the coils 77A and 77B to a point indicated as signal ground. This is to indicate that the rod 77 and the coils 77A and 77B are electrically connected as indicated to the chassis of the turntable. The stray capacitance between the turntable and the rod 77 and indicated at 99 serves to complete a loop similar to that provided by the U shaped support rod of FIGURE 1.

In one head constructed in accordance with FIGURE 10 and found to work well with either of the embodiments of the tone arms illustrated herein the resistors 90 and 89 were each 47K and the capacitors 91 and 92 were each 4 microfarads at one volt (electrolytic). The varicaps were type 1N3182 with the windings 95 and 96 being about 1 microhenry for use with 50 and 60 megacycle oscillators (about 6 turns of #28 enamel or cotton covered wire). The coils 95 and 96 were slug tuned so that the two resonant circuits were approximately equal to 50 and 60 megacycles, respectively. It has been found that favorable results are obtained with the resonant circuits in the head tuned to with one to four megacycles of the frequency of the 50 and 60 megacycle oscillators. A conventional variable reluctance pickup cartridge 86 such as that manufactured and sold under the trademark "SHUR" No. M–44–5 was found to work well.

The head support systems disclosed herein are also readily utilized with an embodiment of the pickup head having a miniature radio frequency signal transmitting system carried therewithin and adapted to provide output R-F energy modulated in accordance with movement of the stylus. Thus in FIGURES 11–17 a further embodiment of the invention is illustrated making use of such a head and a low cost simplified pickup arm wherein the head is moved along the arm by the operator grasping the head rather than by operation of the novel remote controls of the previous embodiments.

In FIGURE 11 a phonograph turntable assembly 110 has a power supply cord 112 for the driving motor within the turntable assembly. The switch 113 controls the motor for driving the turntable 114 on which is placed the record 115. The tone arm and pickup assembly 120 includes the mounting block 117 which rotates about the vertical axis of pivot 118, the horizontal cantilever rod 119 carried by block 117 and the pickup head 122 mounted to move along such rod. The antenna lead 124 from a radio receiver is connected to the rod 119 which acts as an antenna. The connection of the antenna lead 124 to rod 119 may be made in any manner which will allow mounting block 117 to turn between its operating position shown in solid lines in FIGURE 12 and its non-operating position shown by dotted lines.

The pickup head 122 contains a conventional cartridge 125 having a needle 126, the cartridge here shown being for use with a stereophonic record as distinguished by the four leads 130, 131, 132 and 133 of FIGURE 14. These leads are connected to a suitable low power, lightweight, compact radio transmission means illustrated generally as 136 within pickup head 122. FIGURE 15 illustrates a specific radio transmission means for stereophonic phonographs comprising two tunnel diode F.M. oscillators connected in series through resistor 138 and powered by a battery 140. The tunnel diode oscillators consist of a tunnel diode 141, an oscillator coil 142, capacitor 143, diode bias resistor 144, cartridge coupling capacitor 145 and cartridge matching resistor 146, all interconnected in the usual and well known manner shown schematically in FIGURE 15.

Such a radio transmitter has been found to be extremely satisfactory when operating at a power level of approximately 50 milliwatts while drawing approximately two milliamperes of power from power supply 140 which is a conventional miniature 1.3 volt battery.

The pickup head 122 is carried by rod 119 by means of two rollers 141 mounted on brackets 143. The rollers 141 have a concave rolling surface 144 to fit the round rod 119 thereby providing lateral stability as the head 122 moves longitudinally along rod 119. The rollers have been found suitable when made of nylon but they may be of any lightweight, low friction material. With rolling friction between the movable head 122 and the rod 119, the lateral force required to bove head 122 along rod 119 is held to a minimum and the dust problem known to many radial tone arm constructions is virtually eliminated. For assuring a minimum of dust particles even collecting on the rod 119, the same may be coated with Teflon and such coating will not interfere with the properties of rod 119 when the same is used as an antenna.

In operation, mounting block 117 is rotated to its extreme position shown by solid lines in FIGURE 12 so that rod 119 is parallel to the radius 147 of record 115 which passes through the point of contact of the needle 126 with such record. Throughout the playing of the record, the needle will travel along the radial path 147. In a conventional phonograph tone arm, the leads 130, 131, 132 and 133 connected to cartridge 125 would be carried in a stiff shielding material which would extend along the tone arm to a preamplifier and amplifier which are a part of all modern phonograph sets. By utilizing this invention, no such shielded connection is required because there is no solid conductor connection between the cartridge 125 and the preamplifier and amplifier. Instead, radio transmission means, such as that illustrated in FIGURE 15, sends a radio signal of the recorded sounds to antenna 119 from which it is fed into a radio receiver means incorporating the preamplifier and amplifier.

The absence of the requirement for a physical connection of electric leads between the cartridge and the preamplifier has allowed the movable portion of the tone arm assembly to be reduced in size, weight and mass to that of the small movable pickup head 122. Such head has a weight of approximately 20 grams, or less than one ounce, inclusive of all the components necessary for operation. The use of printed circuits will permit the weight of the pickup head to be reduced to 10 grams or less. With such a small weight and mass, the only significant lateral force required to move head 122 during record play is that necessary to overcome the rolling friction of rollers 141 along rod 119. This force has been measured in one model to be approximately one-half gram and is of a uniform value throughout record play. Consequently, the head 122 has been found to track extremely well at a tracking force of about one gram. These statistics make the advantage of a tone arm of this design readily apparent to one familiar with the art.

At the end of the record play, a lifting force may be applied to lifting bracket 148 and the tone arm assembly 120 rotated through the angle "*a*" to the retracted position shown by the dotted lines of FIGURE 12. When fully retracted, head 122 may be supported on peg 152 thereby holding needle 126 free from contact with any structure.

In FIGURE 16 the cantilever rod means for mounting the pickup head 122 is a loop 149 having an upper leg 150 and a lower leg 150'. In this design leg 150' is held against lengthwise movement relative to mounting block 117 but is free to turn about its axis. By depressing button 151, leg 150 is swung about the axis of leg 150' thereby tilting head 122 and retracting needle 126 from contact with record 115. The head may now be moved with ease along leg 150' to any desired point. With button 151 depressed, mounting block 117 may be rotated through angle "*a*" so as to place loop 149 in its rest position corresponding to the dotted line position of rod 119 shown in FIGURE 12. Of course, it is recognized that leg 150 may pass through openings in head 122 or it may be fastened thereto in some manner, as well as passing over the top as shown in FIGURE 16.

In FIGURE 17 antenna 154 is separate from the cantilever pickup head support rod 119. In this case the flexible antenna lead 124 of the radio receiver and amplifier is connected to antenna 154. The exact location of the receiving antenna with respect to the lead 122 is critical only in respect to the fact that the antenna must be within the field of transmission of the radio transmission means 136.

Various embodiments of the novel pickup head and novel tone arm have been disclosed in order to clearly teach to those skilled in the art the presently preferred manner of achieving the beneficial results of the invention. The various heads can be fabricated using low cost components, and since the heads are in no way connected to other components by direct mechanical-electrical wiring the same can be easily cleaned or replaced. The heads are very lightweight, particularly the variable capacitance and variable reluctance embodiments, and therefore very little tracking force is required to move the head along the arm. The output signals from the oscillator (oscillators in case of stereophonic) can be applied directly to conventional amplifiers and thus existing equipment is readily converted to use the invention. Stylus pressure is able to be made very low by comparison to conventional tone arm and head assemblies. It has been found that the heads will track properly even though the turntable is placed on a substantial slant, and also it is found that there is little tendency for the head to jump a groove even though the turntable is jarred. It is believed that this is due to the light weight of the head and the manner in which the head is effectively "free floating" on the support arm and adapted for rotational movement thereabout while the stylus is engaged with the record. It is also important to note that the arm can move up and down without affecting the head or engagement of the stylus with the record. Heavy and accurately positioned counterbalances and damping devices heretofore required with prior art systems are thus not needed. The capacitive unit has been found to provide faithful reproduction over the greatest frequency range, with essentially complete channel separation being obtained in the stereophonic version, while the variable reluctance version permits usage of conventional readily available variable reluctance stylus assemblies.

While the invention has been disclosed by reference to presently preferred embodiments, it is intended that those changes and modifications which become obvious to a person skilled in the art as a result of the teachings hereof will be encompassed by the following claims.

What is claimed is:

1. A phonograph pickup head and support assembly for reproduction of information contained on a record which is rotated during information retrieval comprising in combination: a support arm; means positioning said arm parallel to the record; a pickup head supported on said arm for relative translational movement with respect thereto and having recorded information signal sensing means movable along the record; signal output means included in said head and responsive to signals provided thereto by said sensing means; an elongated flexible head positioning member; means supporting said flexible member parallel to said arm and adjacent one end of said head which is remote from the sensing means of said head; and selectively operable means for bringing a portion of said head into engagement with said flexible member and for moving said flexible member relative to said arm to thereby move said head along said arm.

2. Apparatus as defined in claim 1 wherein said arm includes a rod of radio frequency signal conducting material and wherein said head is removably supported thereon for relative rotation with respect thereto during movement between positions of engagement and disengagement of said sensing means with respect to the record.

3. Apparatus as defined in claim 1 wherein: said signal output means includes resonant circuit means coupled with said sensing means; oscillator means maintained stationary with respect to said head; and signal conveying means coupling said oscillator means with said resonant circuit means to cause output signals from said oscillator means to vary in accordance with changes in said resonant circuit means.

4. Apparatus as defined in claim 3 wherein said arm constitutes said signal conveying means.

5. Apparatus as defined in claim 3 wherein said signal conveying means includes said arm, wherein said arm includes a rod of radio frequency conductive material, and wherein said resonant circuit means includes an inductor having its longitudinal axis substantially perpendicular to the longitudinal axis of said rod.

6. Apparatus as defined in claim 3 wherein said oscillator means includes first and second radio frequency oscillators adapted to operate at first and second frequencies, respectively; and wherein said resonant circuit means includes first and second resonant circuits respectively tuned to frequencies near to the said first and second frequencies.

7. Apparatus as defined in claim 6 wherein: said signal conveying means includes said arm; said arm includes a rod of radio frequency conductive material; and said resonant circuit means includes first and second resonant circuits each having an inductor mounted in said head with the longitudinal axis of each inductor substantially perpendicular to the longitudinal axis of said rod.

8. A radial phonograph tone arm system comprising a pivotally mounted mounting block, a U-shaped rod projecting horizontally from said mounting block, a first leg of said U-shaped rod being held against lengthwise movement relative to said mounting block and being rotatable about its longitudinal axis, the other leg of said U-shaped rod extending through a slot in said mounting block, a pickup head having a needle and first circuit means responsive to vibrations of said needle, roller means spaced from said needle and supporting said pickup head on said rotatable leg of said U-shaped rod and movable along the length thereof, said other leg of said U-shaped rod being engageable with a portion of said pickup head at the side of said roller means remote from said needle, control means in said mounting block engageable with said other leg of said U-shaped rod to swing the same downward to effect tilting of said pickup head about the first leg of said U-shaped rod to raise the needle, and a flexible drive member disposed inside said rod and movable with respect thereto, said other leg of said rod having an elongated slot therein and said head having a drive member engaging portion engageable with said drive member through said slot when said other leg is swung downward.

9. A system as defined in claim 8 and including second circuit means coupled with said rod and responsive to modulations of said first circuit means to provide output signals representative of the record induced vibrations of the needle.

10. Apparatus for use with an information retrieval system having information recorded on a record which is rotated during information retrieval comprising in combination: tone arm means; arm support means supporting said tone arm means in a fixed position adjacent to the record during information retrieval; a pickup head having information detecting means carried therewithin and supported by said arm means for translational movement along the arm therealong during information retrieval; head moving and control means selectively engageable with said head to move said head to a selected position along said arm means; said tone arm means including a first elongated rod extending outwardly from said support means; a second elongated rod; means maintaining said second rod parallel to said first rod; said head moving and control means including an elongated flexible drive member carried by said second rod and movable with respect thereto; and said control means further including means moving second rod with respect to said first rod to bring said drive member into engagement with said head and for causing translation of said drive member with respect to said second rod.

11. Apparatus as defined in claim 10 wherein said second rod is disposed within said first rod.

12. Apparatus as defined in claim 11 wherein said second rod has first and second elongated slots with said drive member being disposed within said end slots and extending around the end of said second rod remote from said arm support means, said first rod being a hollow tubular rod with an elongated slot being provided therein to expose the section of said drive member in one of the slots of said second rod for selective engagement with said head when said second rod is rotated with respect to said first rod.

13. Apparatus as defined in claim 10 wherein said first and second rods are joined at one end to form a U-shaped arm.

14. Apparatus as defined in claim 13 wherein said drive member is an endless belt, said arm is a hollow tubular U-shaped rod having said belt disposed therewithin and provided with an elongated slot along one leg thereof, and said head has coupling means positionable in said slot for engagement with said belt.

15. Apparatus as defined in claim 13 wherein said arm means includes a third rod disposed about said first rod.

16. In a phonograph system having a turntable for rotating a disc record and a tone arm extending across the record parallel to a radius of the record and held stationary during record play, oscillator means electrically coupled to said arm, a pickup head having no external leads attached thereto and adapted to rest on said arm for relative movement therealong during record play, said head having stylus means engageable with the record and including a resonant circuit coupled with the stylus means and inductively coupled with the arm, whereby output signals from the oscillator means are varied in accordance with changes in the resonant circuit due to stylus movements.

17. Apparatus as defined in claim 16 wherein said oscillator means includes first and second oscillators operating at different frequencies and said resonant circuit means includes: variable capacitance means comprising a first plate secured to said stylus means and second and third plates spaced from said first plate and held stationary with respect thereto; inductance means including a first winding coupled to said first and third plates and a second winding coupled to said first and second plates with the longitudinal axes of said coils being held substantially perpendicular to the longitudinal axis of the arm when the head is supported by the arm, the said first winding and first and third plates defining a first resonant circuit and said first and second plates and said second winding defining a second resonant circuit with the said resonant circuits being resonant at different frequencies which are approximately the same as the frequencies of said first and second oscillators.

18. Apparatus as defined in claim 16 wherein: said resonant circuit means includes a variable reluctance pickup circuit having first and second stationary inductors and a movable member secured to said stylus and positioned adjacent to said inductors, third and fourth inductors respectively connected in series circuit with said first and second inductors, and first and second variable capacitance diodes respectively connected across said third and fourth inductors.

19. Apparatus for use with an information retrieval system having information recorded on a record which is rotated during information retrieval comprising in combination: tone arm means; arm support means supporting said tone arm means in a fixed position adjacent to the record during information retrieval; a pickup head having information detecting means carried therewithin and supported by said arm means for translational movement along the arm therealong during information retrieval; and head moving and control means including an elongated flexible member movable relative to said arm in a direction parallel to the longitudinal extent of said arm and selectively engageable with said head to move said head to a selected position along said arm means.

20. Apparatus as defined in claim 19 wherein said head rests on the exterior of said arm means and is positioned for rotation of said detection means about said arm means for engagement and disengagement of said detection means with the record.

21. Apparatus as defined in claim 19 wherein said head includes housing means having an upstanding lug on the end thereof remote from the information detecting means, said lug being selectively engaged with said flexible member.

22. Apparatus as defined in claim 19 wherein said flexible member is endless and said moving and control means includes a rotatable drive member having said flexible member disposed thereabout, and a control shaft connected to said rotatable drive member and extending upwardly from said arm support means for manual operation.

23. A pickup head for a stereophonic sound reproducing system wherein the head is removably supported on a conductive rod for movement along the rod during record play, comprising in combination: first and second windings forming first and second inductors having their longitudinal axes oriented within the head to be substantially perpendicular to the rod when the head is supported on the rod; first and second variable capacitance diodes respectively connected across said first and second windings; first and second coupling capacitors respectively connected to said first and second diodes; and connector means connected to said capacitors and to said diodes for receiving the terminals of a variable reluctance stereophonic pickup cartridge.

References Cited

UNITED STATES PATENTS

| | | | |
|---|---|---|---|
| 2,413,206 | 12/1946 | Worsham | 274—23 X |
| 2,436,129 | 2/1948 | Weathers | 179—100.4 X |
| 2,488,927 | 11/1949 | Owens | 179—100.4 X |

(Other references on following page)